INVENTOR.
ARTHUR F. PEZZOLI
BY
Arthur H Seidel
ATTORNEY

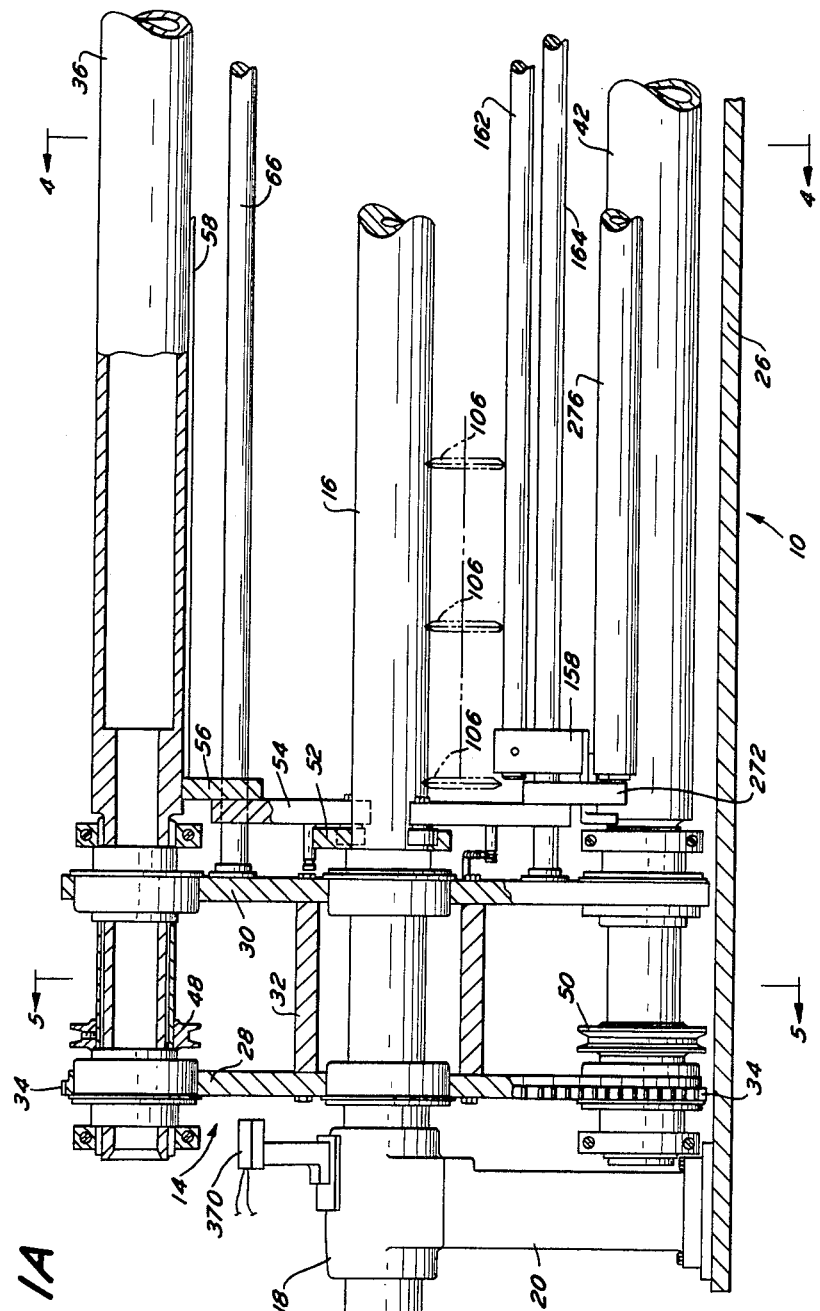

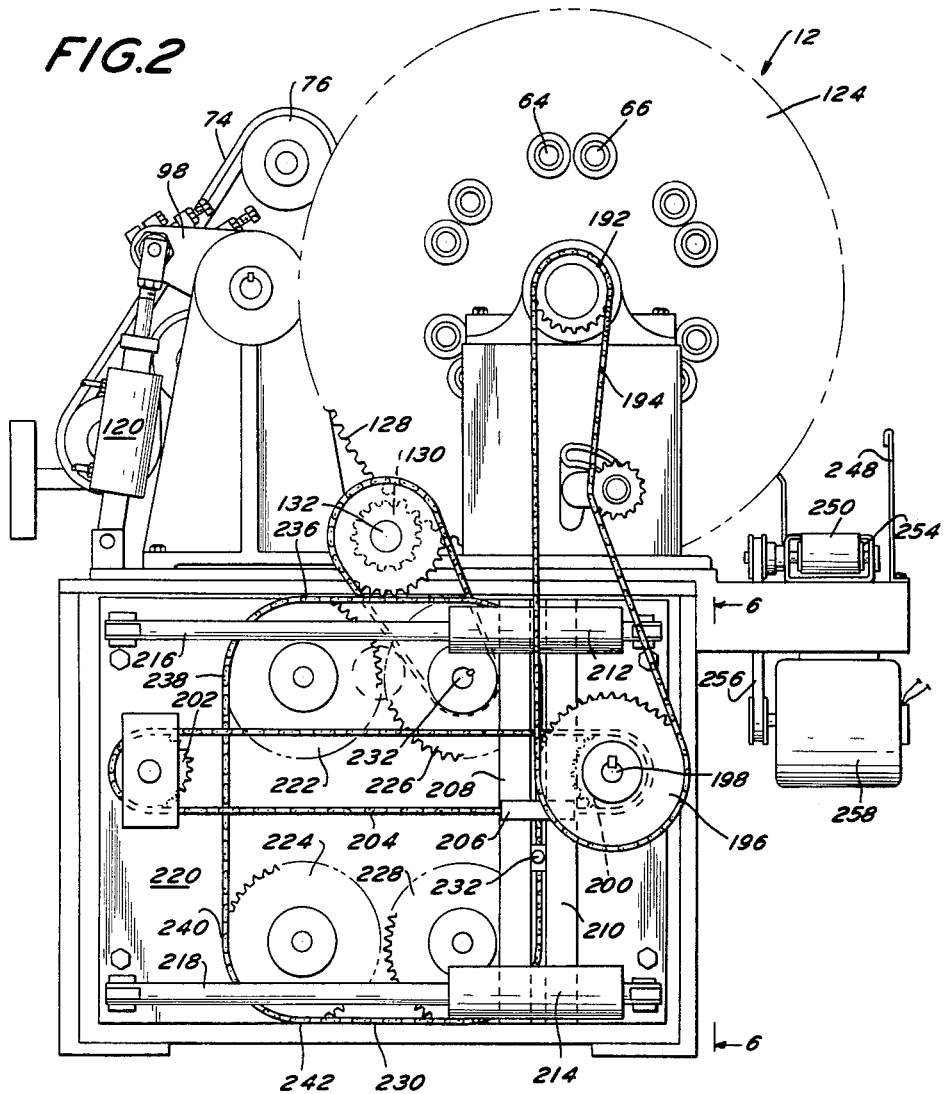

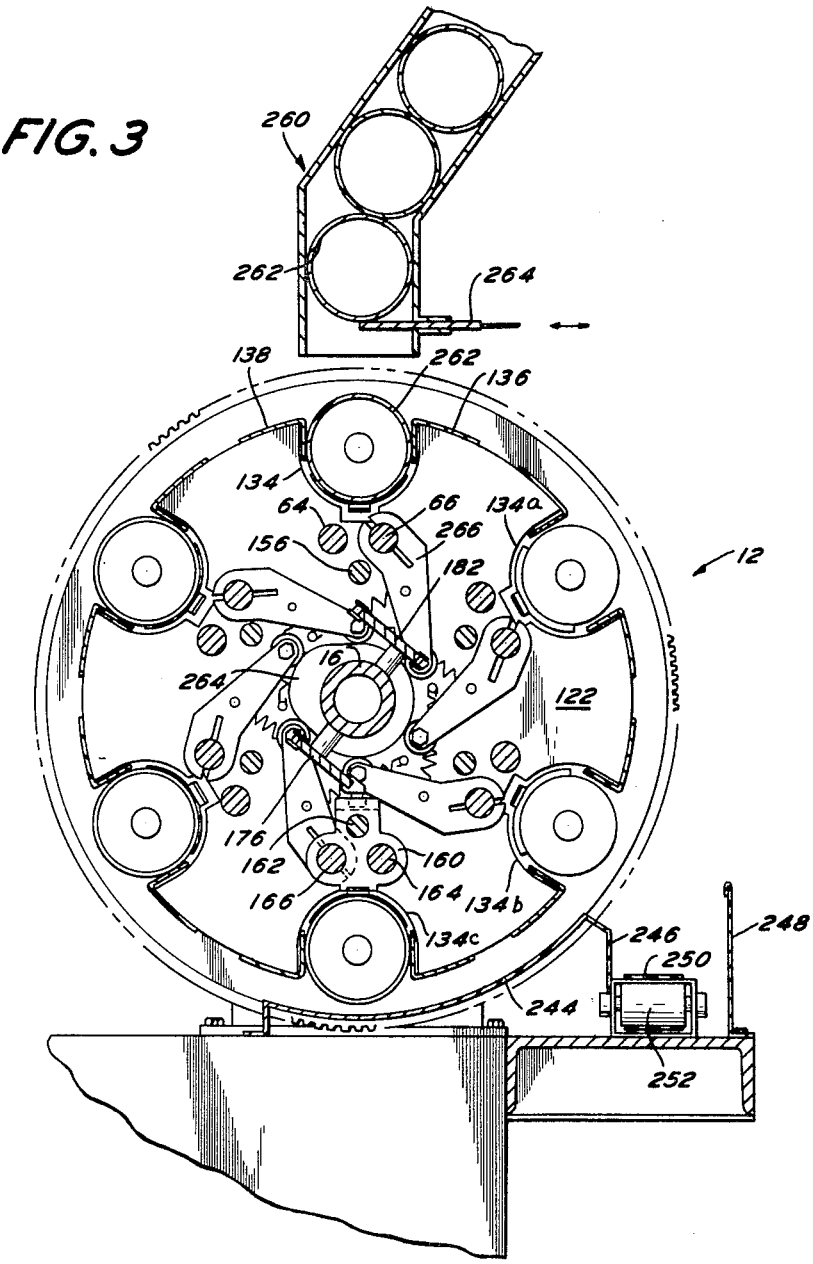

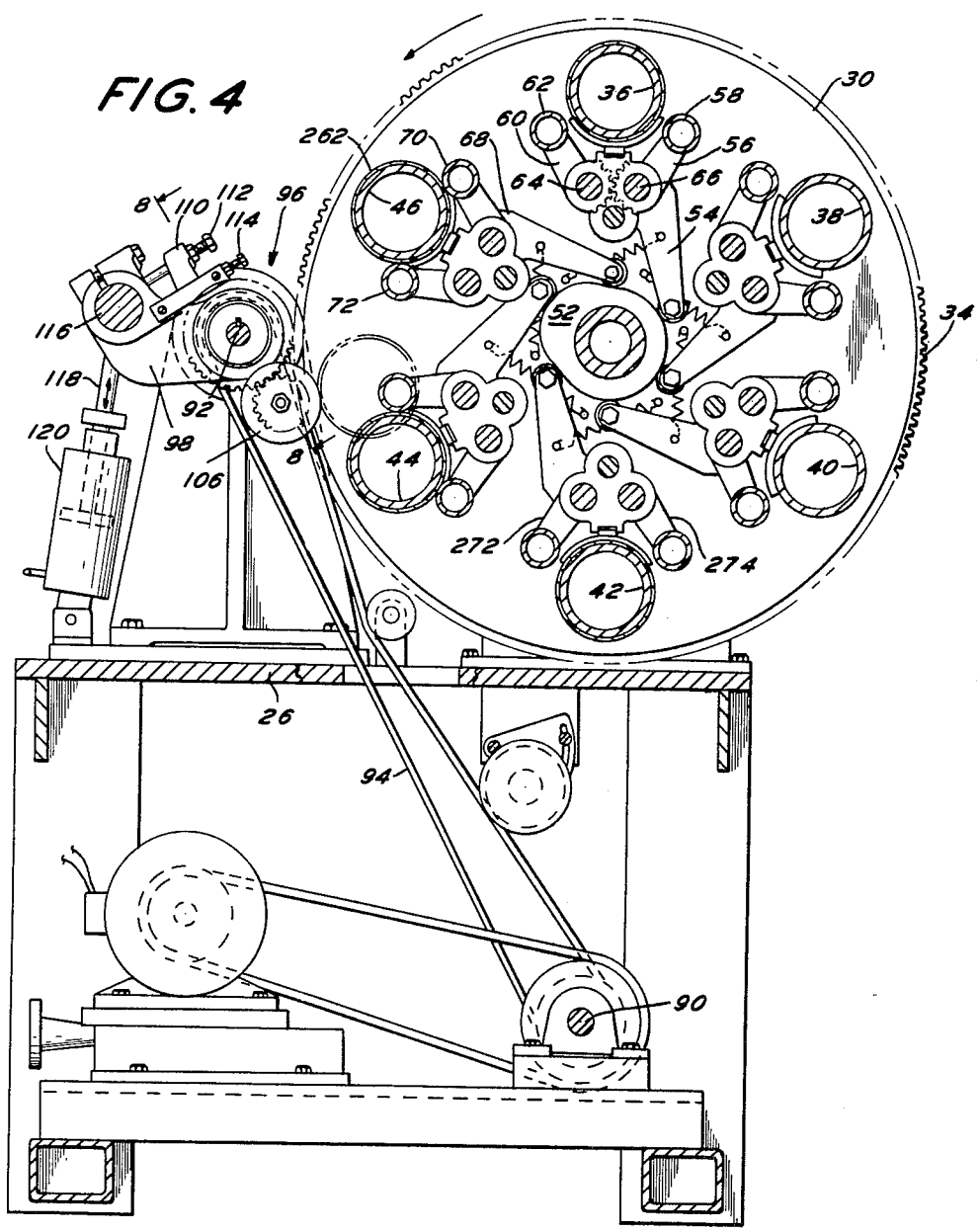

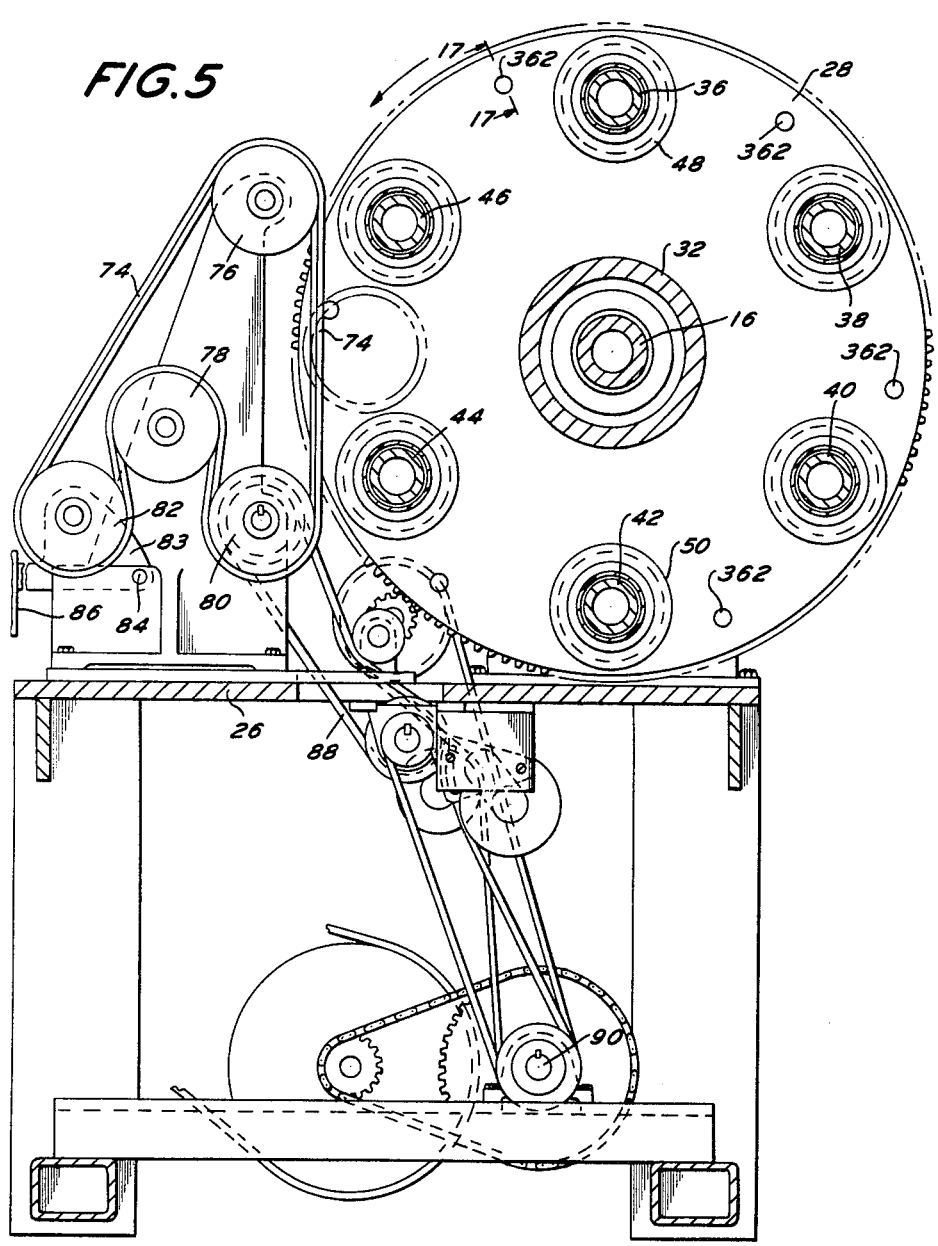

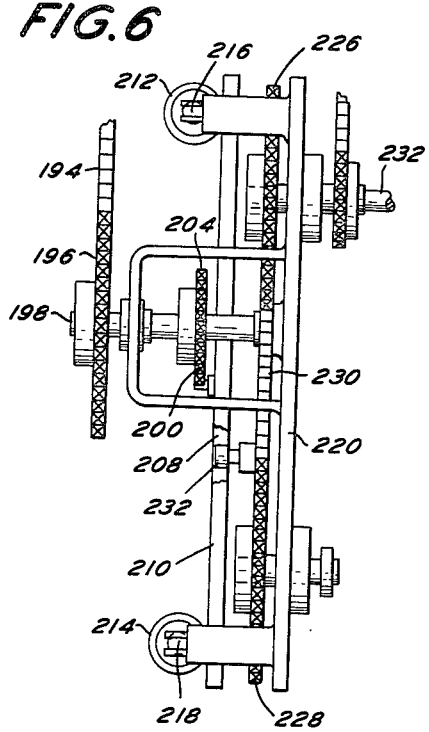
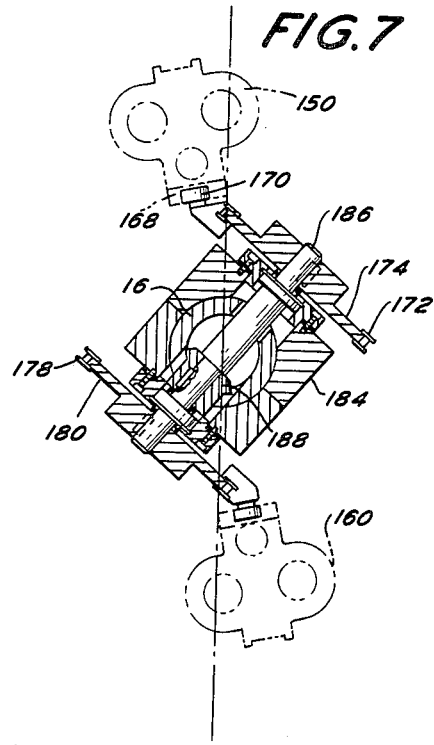
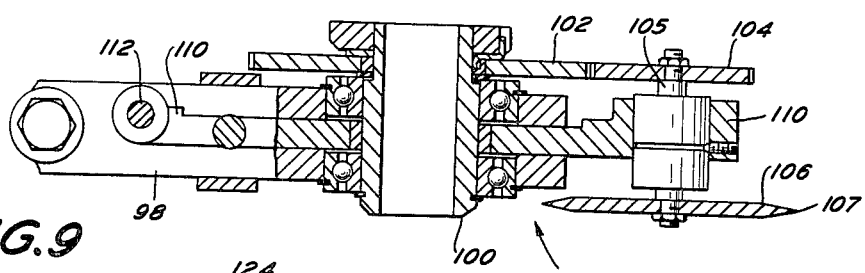
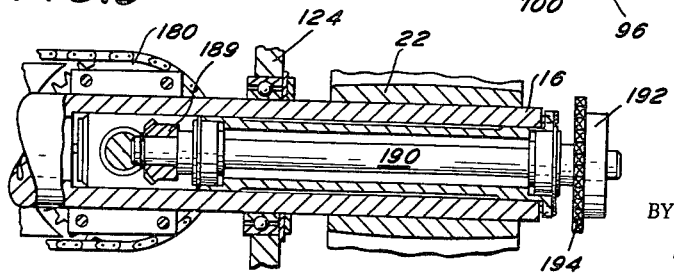

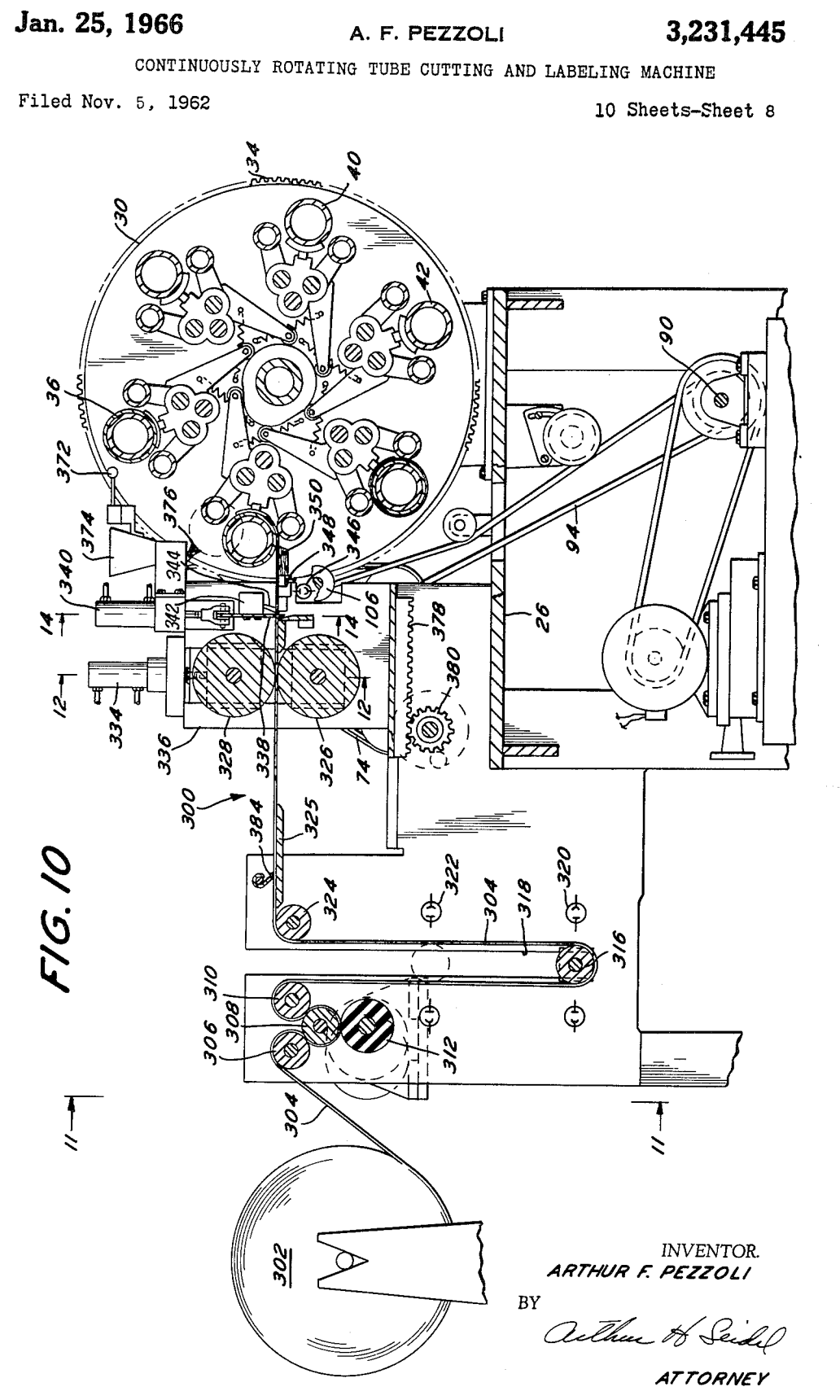

Jan. 25, 1966  A. F. PEZZOLI  3,231,445
CONTINUOUSLY ROTATING TUBE CUTTING AND LABELING MACHINE
Filed Nov. 5, 1962  10 Sheets-Sheet 8

FIG. 10

INVENTOR.
ARTHUR F. PEZZOLI
BY
*Arthur H. Seidel*
ATTORNEY

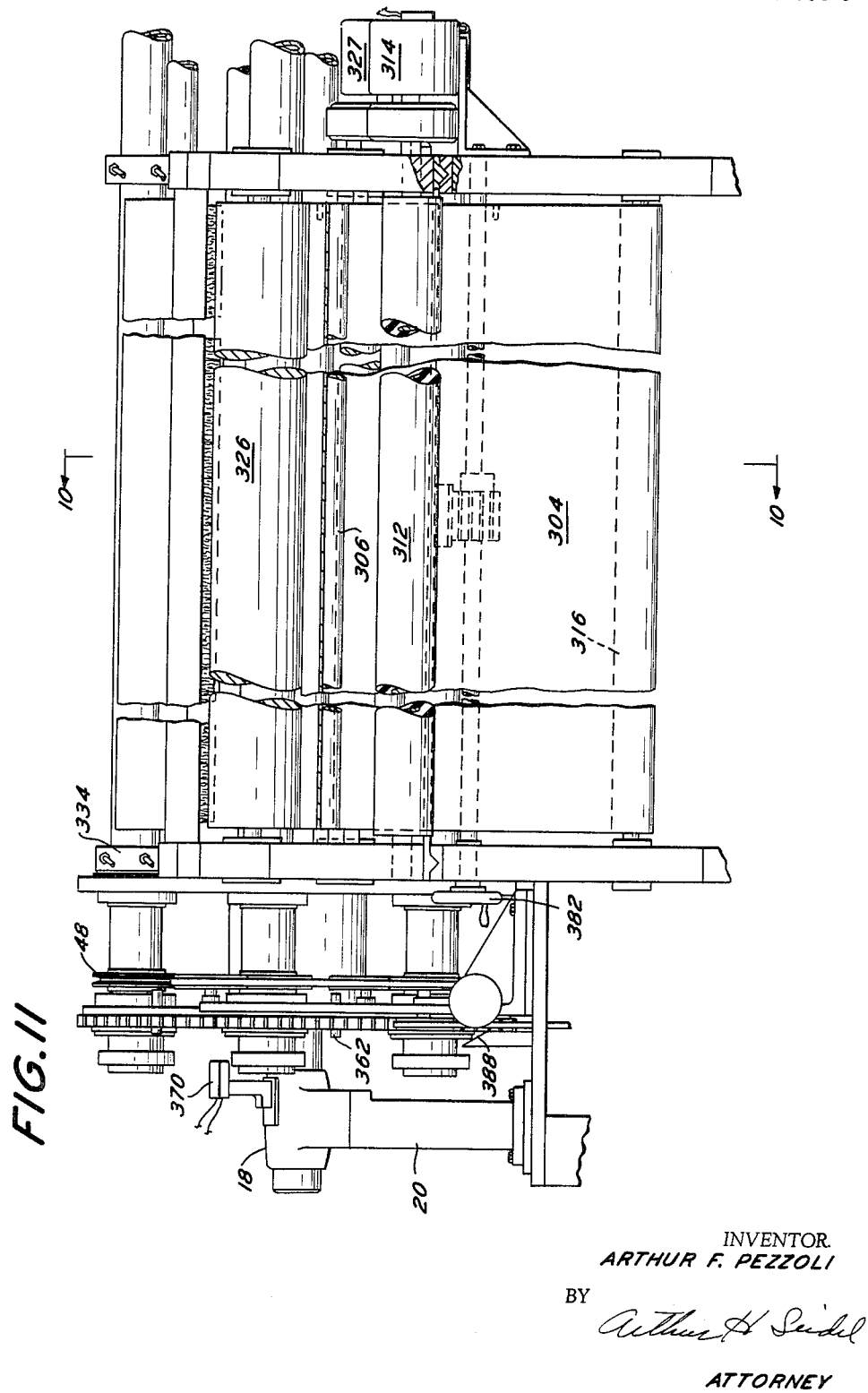

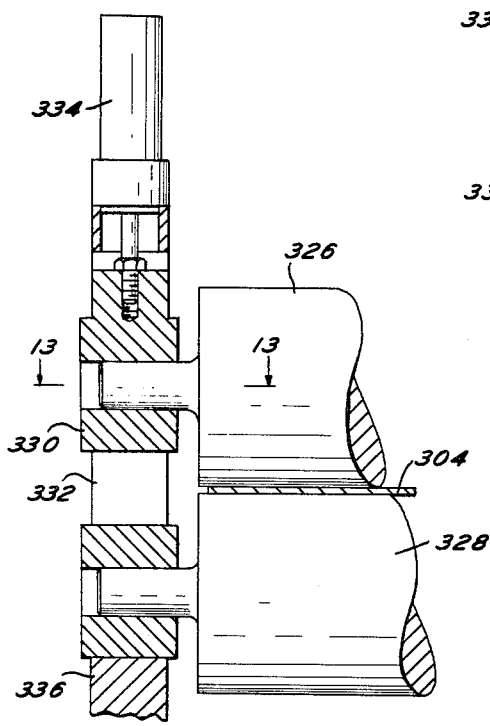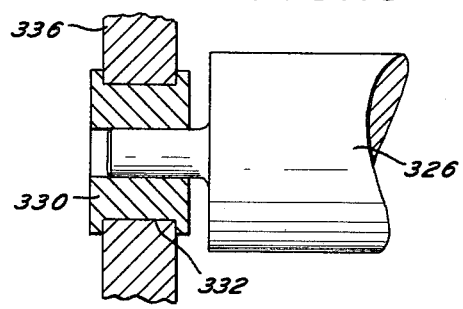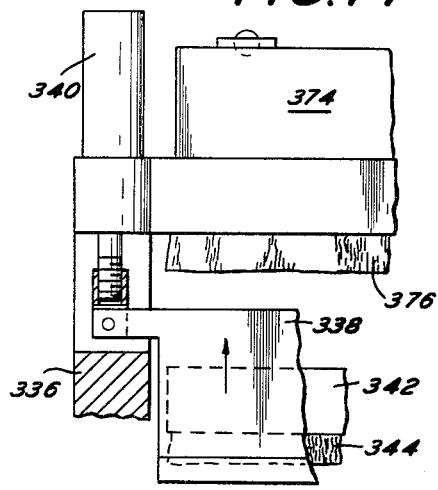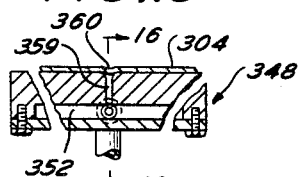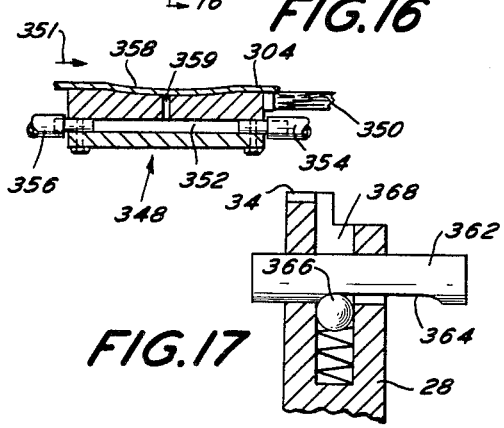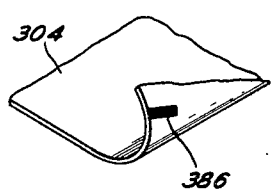

United States Patent Office 3,231,445
Patented Jan. 25, 1966

3,231,445
CONTINUOUSLY ROTATING TUBE CUTTING
AND LABELING MACHINE
Arthur F. Pezzoli, Upper Darby, Pa., assignor to Dietz
Machine Works, Inc., Philadelphia, Pa., a corporation
of Pennsylvania
Filed Nov. 5, 1962, Ser. No. 235,456
13 Claims. (Cl. 156—355)

This invention relates to a continuously rotating tube cutting machine, and more particularly, to a cutting machine having continuously rotating mandrels associated with means for feeding tubes to be cut onto the mandrels, means for applying labels to the tubes while on the mandrels, means for cutting the tubes on the mandrels, and means for removing cut tubes from the mandrels.

This application is a continuation-in-part of my copending application Serial No. 223,475, filed September 13, 1962, and entitled Continuously Rotating Tube Cutting Machine.

The cutting machine of the present invention is referred to by those skilled in the art as a recutter. A recutter is designed to recut uniform lengths of tubing into smaller lengths. The present invention is particularly designed for recutting tubes of paper or paper-like material which have a thin wall thickness. The machine of the present invention is particularly adapted for use with tubes having a wall thickness of approximately 1/32 of an inch.

All of the known recutters proposed heretofore are of the intermittently operated type. Due to the large mass of the moving parts, the maximum rate of production of such intermittently operated recutters is limited. At the present time, the fastest recutter of the intermittently operated type will recut approximately thirty-five tubes per minute. The machine of the present invention is designed so as to have a minimum productive capacity of sixty tubes per minute. This substantial doubling of the productive capacity of the recutter of the present invention is accomplished by a structural interrelationship which facilitates the continuous rotating of the mandrels on which the tubes will be cut.

The present invention includes a turret having a plurality of mandrels extending therefrom and supported thereby in cantilever fashion. A means is provided to continuously rotate the turret at a uniform speed. A loading turret is associated with the mandrel turret and means are provided to assure that both turrets rotate at the same rate of speed in the same direction. Various devices are associated with the loading turret which facilitate transfer of uncut tubes from the loading turret onto the mandrels and removal from the mandrels after the tube has been recut into a plurality of smaller lengths.

The cutting action is preferably effected by a plurality of rotating knives which are individually adjustable for pressure. A means is provided to rotate the mandrel only during that portion of its rotary cycle when it is in the vicinity of the rotating knives. A conveyor device is provided to feed tubes onto the loading turret and a second conveyor device is provided to receive the smaller cut lengths of the tube and convey the same away from the cutting machine of the present invention.

A means is provided to back up the rotating mandrels adjacent the cutting knives. Such means includes a pair of back up rollers which are actuated to provide support for the mandrel during the cutting action. In accomplishing the actuation of the various components of the machine of the present invention, all components are structurally interrelated with a single drive source so that intermittently operated timing devices are eliminated and positive assurance is provided that the cutting machine will perform over extended periods of time without a substantial degree of maintenance or attention by operating personnel. In this regard, the cutting machine is completely automatic and capable of operating twenty-four hours a day over extended periods of time.

The present invention includes a means for cutting an endless supply of label stock into short lengths and feeding the short lengths so that they are convolutely applied to the tubes before the tubes are cut. Means are provided to prevent label stock from being fed to the mandrels when the mandrels do not have a tube telescoped thereover.

It is an object of the present invention to provide a novel cutting machine.

It is another object of the present invention to provide a novel tube recutter, and method for making labeled tubes.

It is another object of the present invention to provide a labeling device for a cutting machine having a continuously rotating turret supporting a plurality of mandrels in cantilever fashion, which mandrels are adapted to support tubes to be cut.

It is another object of the present invention to provide a novel cutting machine wherein a loading turret and a mandrel turret are simultaneously rotated in the same direction at the same rate of speed so that tubes to be cut on the loading turret may be automatically transferred onto, labeled and removed from mandrels supported by the mandrel turret.

It is another object of the present invention to provide a novel cutting machine wherein tubes to be cut are automatically transferred from a loading turret to a mandrel turret in response to the rotary disposition of the tube on the loading turret with means being provided to convolutely apply a label to each tube before it is cut.

It is another object to provide a labeling device adapted to apply labels to tubes disposed on a continuously rotating turret.

Other objects will appear hereinafter.

For the purpose of illustrating the invention there is shown in the drawings forms which are presently preferred; it being understood, however, that this invention is not limited to the precise arrangements and instrumentalities shown.

FIGURE 1A is a partial longitudinal sectional view of the mandrel turret end of the machine of the present invention.

FIGURE 2 is an end view taken along the lines 2—2 in FIGURE 1B.

FIGURE 3 is a sectional view taken along the lines 3—3 in FIGURE 1B.

FIGURE 4 is a sectional view taken along the lines 4—4 in FIGURE 1A.

FIGURE 5 is a sectional view taken along the lines 5—5 in FIGURE 1A.

FIGURE 6 is a view taken along the lines 6—6 in FIGURE 2.

FIGURE 7 is a sectional view taken along the lines 7—7 in FIGURE 1B.

FIGURE 8 is a sectional view taken along the lines 8—8 in FIGURE 4.

FIGURE 9 is a sectional view taken along the lines 9—9 in FIGURE 1B.

FIGURE 10 is a sectional view illustrating the components of the labeling device.

FIGURE 11 is a sectional view taken along the lines 11—11 in FIGURE 10.

FIGURE 12 is a sectional view taken along the lines 12—12 in FIGURE 10.

FIGURE 13 is a sectional view taken along the lines 13—13 in FIGURE 12.

FIGURE 14 is a sectional view taken along the lines 14—14 in FIGURE 10.

FIGURE 15 is a longitudinal sectional view of the vacuum transfer mechanism of the labeling device.

FIGURE 16 is a sectional view taken along the lines 16—16 in FIGURE 15.

FIGURE 17 is a sectional view taken along the lines 17—17 in FIGURE 15.

FIGURE 18 is a partial perspective view of a portion of the label stock.

Figure 1B:
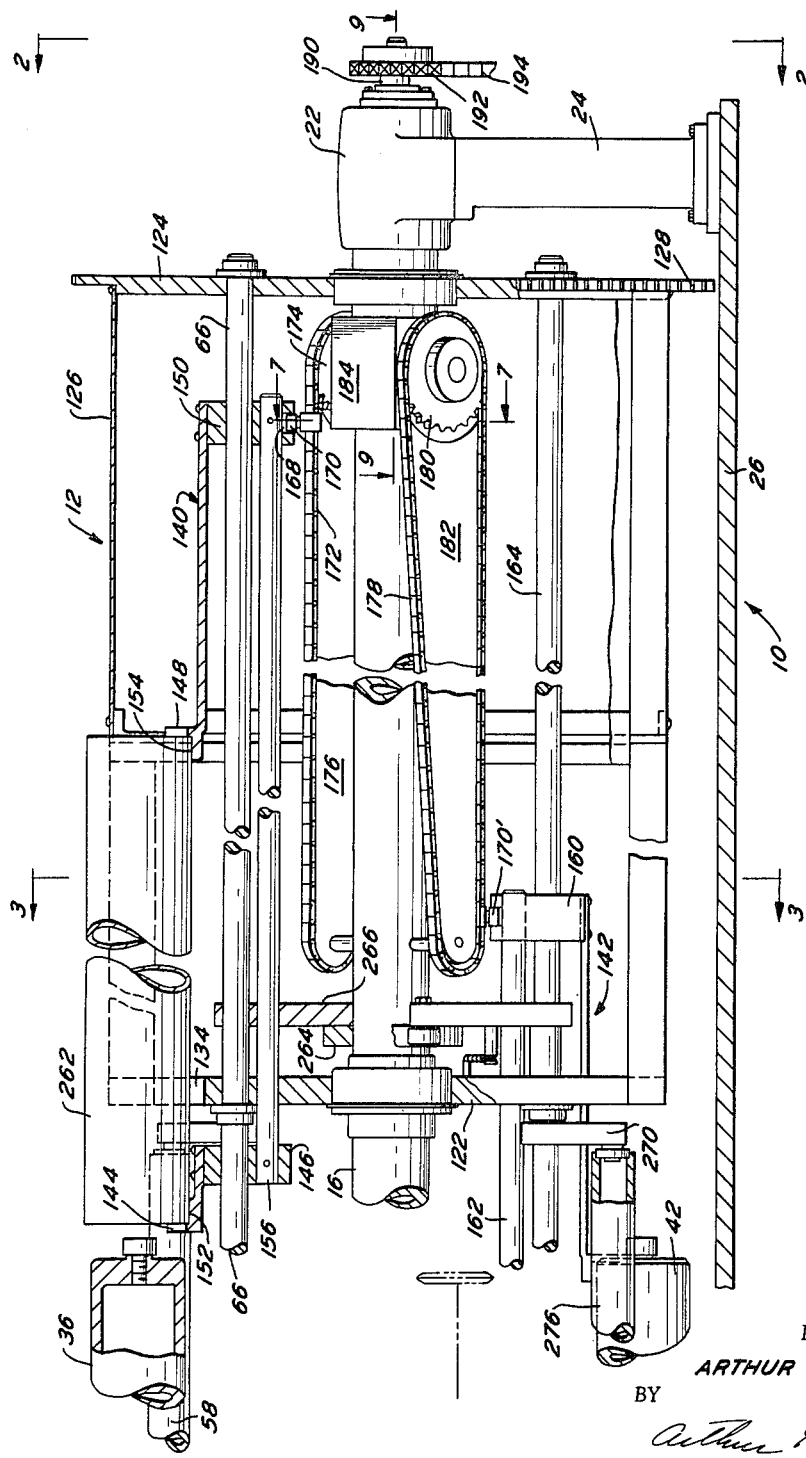
FIGURE 1B is a partial longitudinal sectional view of the loading turret end of the machine of the present invention.

Referring to the drawings in detail, wherein like numerals indicate like elements, there is shown in FIGURES 1A and 1B a cutting machine of the present invention designated generally as 10. Due to the length of the machine 10, the same cannot be illustrated in one view. In order to orientate the illustrations in FIGURES 1A and 1B, the righthand end of FIGURE 1A should be juxtaposed to the lefthand end of the illustration in FIGURE 1B.

The cutting machine 10 includes a loading turret 12 illustrated more clearly in FIGURE 1B and a mandrel turret 14 in line with one another. Each of the turrets 12 and 14 is supported for rotation in the same direction at the same speed by means of a centrally disposed fixed shaft 16. Rotary bearings are disposed between the turrets and the central shaft 16 to support the same. The ends of the central shaft 16 are supported in bearings 18 and 22 which in turn are supported from a base plate 26 by standards 20 and 24, respectively.

The mandrel turret 14 includes a pair of spaced circular plates 28 and 30. A spacer sleeve 32 surrounds the central shaft 16 and is disposed between the plates 28 and 30. Any conventional means is provided to secure the plates 28 and 30 to the sleeve 32. Gear teeth 34 are provided on the outer peripheral surface of the plate 28.

A plurality of mandrels 36, 38, 40, 42, 44 and 46 are supported in cantilever fashion at spaced points by the mandrel turret 14 as shown more clearly in FIGURE 4. While six such mandrels are illustrated, a greater or lesser number may be utilized. Since six mandrels are illustrated, they are spaced sixty arcuate degrees from one another at the same radius from the axis of the central shaft 16. As shown more clearly in FIGURES 1A, a pulley 48 is secured to the mandrel 36 between the plates 28 and 30. Also, a pulley 50 is secured to the mandrel 42 between the plates 28 and 30. The purpose of the pulleys which are secured to each of the mandrels 36–46 will be made clear hereinafter.

A cam 52, shown more clearly in FIGURE 4 is fixedly secured to the stationary central shaft 16 adjacent the plate 30. For each mandrel, there is a pair of back up rolls and an actuating mechanism to operate the same. Accordingly, only the back up rolls and actuating mechanism for the mandrels 36 and 46 will be described in detail.

A cam follower arm 54 is provided for the mandrel 36. The lowermost end of the arm 54 terminates in a cam follower which follows the contour of the cam 52. A spring is provided to bias the cam follower into contact with the cam surface on cam 52. Arm 54 is connected to a bracket arm 56. A free end of the bracket arm 56 rotatably supports a back up roll 58.

Bracket arm 56 is provided with a segmental gear which is in meshing engagement with a segmental gear on bracket arm 60. Bracket arm 60 supports at its free end the rotatable back up roll 62. In FIGURE 4, the back up rolls 58 and 62 are spaced from the outer peripheral surface of a tube to be cut and supported by the mandrel 36.

The bracket arms 60 and 56 are rotatably supported by shafts 64 and 66. The shafts 64 and 66 are parallel to one another and extend from the plate 30 through the loading turret 12. Hence, the ends of the shafts 64 and 66 are visible in FIGURE 2. The shafts 64 and 66 maintain a fixed rotary disposition between the loading turret 12 and the turret 14.

The mandrel 46 is provided with a cam follower arm 68 which is structurally interrelated with the cam 52 in the same manner as described above. As illustrated more clearly in FIGURE 4, the cam follower on arm 68 is in engagement with a protrusion of the cam 52 and hence is spaced farther away from the axis of the central shaft 16 than the cam follower on arm 54. As a result of the disposition of the cam follower on arm 68, a bracket arm supporting the back up roller 70 is rotated to a disposition where it is in rolling contact with the tube on mandrel 46. As a result of such rotation of the bracket arm supporting back up roll 70, its mating bracket arm has rotated in an opposite direction so that the back up roll 772 also is in rolling engagement with the periphery of a tube on mandrel 46. The points of contact between the back up rolls 70 and the tube on mandrel 46 are equidistant from an imaginary line extending through the axes of the central shaft 16 and the mandrel 46. Since the mandrels 36–46 are supported in cantilever fashion by the turret 14, the back up rolls rolls for each mandrel provide additional support during the cutting action. Hence, it will be noted that only the back up rolls for mandrels 44 and 46 are in contact with a tube on the periphery of the mandrels, whereas the back up rollers are spaced from the remainder of the mandrels as a function of the contour of the cam 52.

Structure similar to that illustrated in FIGURE 4 for supporting the lefthand end of the back up rolls is also provided for the righthand end of the back up rolls. The said structure for supporting the righthand end of the back up rolls is responsive to a cam within the loading turret 12 and will be described in detail hereinafter.

As shown more clearly in FIGURE 5, a double sided V-belt 74 is supported by a plurality of spaced pulleys 76, 78, 80 and 82. The pulleys are supported for rotation about an axis parallel to the axis of the central shaft 16. Pulley 82 is supported by a member 83. Member 83 is supported for pivotable movement about pin 84. Member 83 is provided with a counterweight 86 which tends to rotate member 83 in a counterclockwise direction in FIGURE 5.

The pulleys on the mandrels, such as pulley 48 on mandrel 36, are adapted to contact the double V-belt 74 at a point just below the 10 o'clock position and lose contact at a point just above the 8 o'clock position in FIGURE 5. During such contact, the mandrel will rotate about its longitudinal axis notwithstanding the fact that it is being rotated by the mandrel turret plates 28 and 30. Contact between the pulleys on the mandrels and the belt 74 causes the portion of belt 74 between pulleys 76 and 80 to move to the left in FIGURE 5. Such movement of the belt 74 causes the pulley 82 to rotate about the pin 84. One of the pulleys for the belt 74, such as pulley 80, is a double sheave pulley driven by a double V-belt 88. A suitable drive connection is provided between the main drive shaft 90 and a pulley around which the belt 88 is disposed.

All rotary movement of the various components of the machine 10 are effected by coupling the components to the main drive shaft 90. The main drive shaft 90 is driven by a conventional sprocket and chain arrangement coupled to a driving motor. By using known coupling elements such as gears and pulley belts, and predetermined mechanical advantages, positive assurance is provided that all rotary components will be in timed relationship with one another without utilizing timing motors, intermittent driving motors, etc. Hence, the phase relationship between rotary components of the machine 10 will be predetermined to assure a proper operating relationship.

As shown more clearly in FIGURE 4, the main drive shaft 90 is coupled to a cutter drive shaft 92 by means of a pulley arrangement cooperating with a V-belt 94. A plurality of knife units 96 are disposed along the length of the cutter drive shaft 92. The number of such units 96 is determined by the number of individual pieces into which the tubes are to be recut. For example, if the tubes to be recut are sixty inches long, six cutter units may be utilized. Each of the cutter units 96 is identical and the position of the knife with respect to the tube to be cut is individually adjustable. Hence, it is only deemed necessary to describe one knife unit 96 in detail.

As shown more clearly in FIGURES 4 and 8, each knife unit 96 includes a housing 98 having a rotatably supported sleeve 100 extending therethrough and offset to one side thereof. As shown more clearly in FIGURE 8, a gear 102 surrounds a reduced diameter portion of the sleeve 100 is keyed thereto. The gear 102 is in meshing engagement with a gear 104. Gear 104 is keyed to a shaft 105 which supports the rotary knife 106. The periphery of the knife 106 has been machined to provide a cutting edge 107. The shaft 105 is rotatably supported in a bearing which extends through a support member 110. The support member 110 surrounds the sleeve 100 and is rotatably supported thereby in a slot in the housing 98.

The support member 110 is manually adjustable with respect to the housing 98 by means of adjusting bolts 112 and 114. The angular disposition of the knife 106 may be adjusted with respect to the shaft 92 by threading bolt 112 inwardly and threading bolt 114 outwardly. Each housing 98 of the units 96 is coupled to shaft 116 which in turn is coupled to a piston rod 118. The piston rod 118 terminates in a piston disposed within cylinder 120. The cylinder 120 is mounted for rotation through a limited angle of rotation with respect to the base plate 26. This piston and cylinder arrangement acts as a bias on the angular disposition of the housings 98 with respect to the shaft 92 and opposes the rotary force imparted to the housings by contact between the knives and the tubes to be cut and the mandrels supporting such tubes.

As shown more clearly in FIGURE 1B, the loading turret 12 includes a pair of spaced parallel plates 122 and 124. Gear teeth are provided on the periphery of plate 124 to rotatably drive the turret 12 in the same direction and at the same speed as the mandrel turret 14. To this end, the teeth 128 are in meshing engagement with a sprocket 130 on shaft 132. Shaft 132 is coupled to the main drive shaft 90 by conventional structure not shown.

As shown more clearly in FIGURES 1B and 3, the plate 122 of the loading turret 12 is provided with spaced notches 134, 134a, 134b, 134c, etc.. The number of such notches corresponds with the number of mandrels on the mandrel turret 14. Each notch is provided with a pair of guide plates 136 and 138. Each guide plate has a flange portion disposed within the notch. The distance between such flange portions corresponds with and is in line contact with diametrically opposite points on the tube to be cut. Conventional means are provided to adjust the position of the various guide plates 136 and 138.

The loading turret 12 is provided with a feed carriage designated generally as 140 and a strip carriage 142. Carriage 140 is designed to transfer tubes from the loading carriage 12 onto the mandrels of the turret 14. Carriage 142 is designed to simultaneously strip a tube which has been cut from the mandrels of the turret 14. As will be made clear hereinafter, the carriages 140 and 142 function simultaneously in opposite directions. As pointed out above, the carriages 142 and 140 are designed to transfer tubes onto the mandrels and remove cut tubes from the mandrels notwithstanding the fact that the mandrels are continuously rotating.

Feed carriage 140 is provided with a semi-circular member 144 secured to a front block 146 as shown more clearly in FIGURE 1B. Carriage 140 also includes a semi-circular member 148 secured to and projecting from a rear block 150. The blocks 146 and 150 are interconnected for simultaneous movement by means of a connector rod 156. A concave supporting surface 152 is provided adjacent the member 144. A concave supporting surface 154 is provided adjacent member 148.

A tube on the loading turret 12 is supported by the surfaces 152 and 154 which are spaced apart for a distance slightly less than a length of the tube. The surfaces 152 and 154 terminate in a radially outwardly directed shoulder which abuts the ends of the tube. Hence, reciprocation of the carriage 140 results in positive reciprocation of the tube to be transferred and supported thereby.

The block 146 is a slave to the block 150 as a result of the connector rod 156. It will be noted that the connector rod 156 extends through a hole in the plate 122 of the loading turret 12. The blocks 146 and 150 are reciprocally supported by the shafts 64 and 66 which extend for the full length of the machine 10. It will be appreciated that a loading carriage 140 is provided for each of the notches 134, 134a, 134b, etc. Carriage 142 is identical with carriage 140 and will be a feeding carriage when disposed in the feeding position. Likewise, when a tube has been cut, the feed carriage 140 will function as a stripping carriage to remove the cut lengths of tubing from the mandrel.

The carriage 142 includes a front block 158 and a rear block 160 interconnected by connector rod 162. Rod 162 extends through and is reciprocally supported by the plate 122 in the same manner as rod 156. Each of the blocks 158 and 160 is provided with structure cooperating with the tube on one of the mandrels in the same manner as described above in connection with carriage 140. As shown more clearly in FIGURE 3, the block 160 is reciprocally supported by the shafts 164 and 166 which correspond with the shafts 64 and 66.

The rear block for each of the carriages is provided with a channel 168 on its innermost surface. Each carriage continuously rotates with the loading turret 12. As each rear block approaches its uppermost position, it receives a pin 170 within its channel for a small portion of its arcuate rotary movement.

The pin 170 is secured to a chain 172. Chain 172 extends around sprocket 174 and is guided by a plate 176. The plate 176 has a straight upper edge which is parallel to the longitudinal axis of the central shaft 16. Plate 176 is fixedly secured to the stationary shaft 16.

As shown more clearly by a comparison of FIGURES 1B and 7, a pin 170′ is adapted to cooperate with the rear block of the carriage 142 which is in the stripping position. Pin 170′ is connected to a chain 178. Chain 178 extends around sprocket 180 and plate 182. Plate 182 is diametrically opposite plate 176. Plate 182 has a straight edge on its lowermost surface which is parallel to the longitudinal axis of shaft 16.

A housing 184 supprounds the central shaft 16 as shown more clearly in FIGURES 1B and 7. The housing 184 is composed of two halves. The sprockets 174 and 180 are rotatably supported by a shaft 186 extending through the housing 184 and shaft 16. A bevel gear 188 surrounds and is keyed to the shaft 186. Bevel gear 188 is in meshing engagement with bevel gear 189. The latter gear is secured to shaft 190 which extends through the righthand end of the shaft 16 as shown more clearly in FIGURE 9. Shaft 190 terminates in a sprocket 192. A chain 194 extends around sprocket 192 and sprocket 196. Sprocket 196 is keyed to a shaft 198.

Shaft 198 is part of a means for intermittently simultaneously rotating the sprockets 174 and 180 in opposite directions. Such means utilizes shaft 198 as an output shaft. As shown more clearly by comparison of FIGURES 2 and 6, a sprocket 200 is keyed to shaft 198. A chain 204 extends around sprocket 200 and a second sprocket 202. The ends of chain 204 are interconnected by a link member 206.

The link member 206 is secured to the side struts 208 and 210 of a reciprocating carriage. The reciprocating carriage includes sleeves 212 and 214 guided for reciprocation on shafts 216 and 218. The shafts 216 and 218 are supported by standards in spaced relation from a base plate 220.

Sprockets 222, 224, 226 and 228 are rotatably supported by base 220 in a plane which is intermediate the plate 220 and the plane of the sprockets 200 and 202 as shown more clearly in FIGURE 6. A chain 230 extends around the sprockets 222–228. A pin 232 extends from the chain 230 to a point between the struts 208 and 210. Sprockets 222, 224 and 228 are idler sprockets. Sprocket 226 is driven from shaft 132 which in turn is driven from the main drive shaft 90.

As shown more clearly in FIGURE 3, a curved plate 244 is disposed beneath the loading turret 12 and extends from a position between 6 o'clock and 7 o'clock to a position between 4 o'clock and 5 o'clock. The plate 244 has a portion extending radially outwardly and terminating in a guide plate 246. A guide plate 248 is provided in spaced relationship to the plate 246. A conveyor is provided between the plates 246 and 248. The conveyor includes an endless belt 250 extending around an idler roller 252 and a driven roller 254 (see FIGURE 2). Roller 254 is driven by means of a belt 256 extending around a pulley on the output shaft of a motor 258 and a pulley integral with the roller 254.

The apparatus disclosed above corresponds with the disclosure in my above mentioned copending application. The apparatus disclosed above is particularly useful when the tubes to be cut already have a label applied thereto or are not intended to have a label applied thereto. As will be made clear hereinafter, labels may be convolutely applied to the tubes while the tubes are being rotated by the mandrel turret 14 and are being continuously rotated about their longitudinal axis by belt 74.

In FIGURE 10, there is illustrated a label applying device designated generally as 300. The device 300 includes a roll 302 of label stock 304. The label stock 304 is fed over idler roller 306, below idler roller 308, and over idler roller 310. A roller 312 driven by motor 314 is juxtaposed to the roller 308 so that the label stock 304 is fed therebetween.

In order to provide for smooth delivery of label stock without repetitious stopping and starting the unwinding of label stock from the roll 302, the label stock 304 is fed from roller 310 to an accumulation device. A variety of accumulation devices may be used. As illustrated, the accumulation device is as follows. The label stock 304 is fed from the roller 310 around dancer roller 316 which is reciprocally supported in guide slot 318. The dancer roller 316 in its lowermost position as illustrated, is disposed between a pair of photoelectric cells 320. In this position of the roller 316, the motor 314 is inactive. The uppermost reciprocatory position of the dancer roller 316 is defined by a pair of spaced photoelectric cells 322. As soon as the dancer roller 316 is between the photoelectric cells 322, motor 314 is activated to feed more label stock 305 thereby causing the roller 316 to descend under the effect of gravity.

The label stock 304 is fed over an idler roller 324 and between a flat supporting plate 325 and a leaf spring 384 which prevents the label stock 304 from moving to the left in FIGURE 10 under the gravity bias on the roller 316. Thereafter, the label stock 304 is fed between roller 326 which is driven by motor 327 and an idler roller 328.

The idler roller 328 biases the label stock 304 into good contact with the roller 326 so that rotation of roller 326 may feed the label stock. As shown more clearly in FIGURE 12, the roller 326 is rotatably supported by a bearing 330 which in turn is reciprocally mounted in a slot 332 in the carriage 336. The bearing 330 is adjustably coupled to the plunger in solenoid 334. A similar plunger and bearing is provided for the end of roller 326 opposite from that illustrated in FIGURE 12.

A cutter blade 338 is reciprocally supported at its ends by the plunger of a pair of solenoids 340 (only one shown in FIGURE 14). As shown more clearly in FIGURE 10, the blade 338 is supported by the carriage 336 to the right of the rollers 326 and 328. The blade 338, as shown more clearly in FIGURE 14, supports a glue pot 342 having a depending brush 344 which is adapted to apply a very narrow band of adhesive to the trailing edge of a label.

Solenoids 334 and 340 are responsive to a photoelectric cell 346 which is supported below and to the right of the blade 338. When photoelectric cell 348 detects a mark 386 on the label stock 304, see FIGURE 18, roller 328 is caused to move upwardly and blade 338 is caused to move downwardly. In this regard, it will be noted that the roller 326 is continuously rotated by its motor 327.

The label stock 304 to the right of the blade 338 is supported by a vacuum transfer mechanism 348. As shown more clearly in FIGURES 15 and 16, the vacuum transfer mechanism 348 includes a housing having a vacuum chamber 352 therein. The direction of feed of the label stock 304 is in the direction of arrow 351 so that the label stock passes over the vacuum transfer mechanism 348 and is supported at its leading edge by a brush 350. Chamber 352 is adapted to be alternately placed in communication with a source of air by way of conduit 356 and in communication with a vacuum pump by way of conduit 354. A plurality of grooves 358 are provided on the upper surface of the housing of the vacuum transfer mechanism 348. The grooves 358 (only one shown) extend in the direction of travel of the label stock 304. Each groove 358 is in communication with the chamber 352 by means of a passageway 359. When the chamber 352 is in communication with the source of vacuum, the elements assume the position illustrated in FIGURES 15 and 16 wherein the label stock 304 is provided with a dip 360 which assists in preventing the label stock 304 from shifting sideways.

As shown more clearly in FIGURES 5 and 17, plate 28 is provided with a plurality of axially extending holes adjacent to each mandrel. A pin 362 is reciprocally supported in each hole. Each pin is provided with a groove 364 adapted to receive a ball 366 and limit the extent of reciprocation of the pin 362 in an axial direction. Each ball 366 is disposed in a radially outwardly extending hole 368 and spring biased radially outwardly. When a tube which is to be cut is being loaded on one of the mandrels, the pin 362 assumes the position in FIGURE 17. If a tube is disposed on a mandrel as detected by microswitch 372, solenoid 370, see FIGURES 11 and 1A, is not activated.

A glue pot 374 is supported by the carriage 336 and is provided with a brush 376 for applying glue to the outer peripheral surface of the tubes before the tubes are placed in a rotative position wherein they contact a label which has been cut from the label stock 304. In order to accommodate different sized tubes, the carriage 336 is provided with a rack 378 in meshing engagement with a pinion 380. Rotation of pinion 380 which in turn causes reciprocation of the carriage 336 toward and away from the axis of rotation of the mandrel turret is accomplished by rotating hand wheel 382.

The remaining structural elements of the machine 10, not heretofore mentioned, are more clearly orientated with respect to the present invention in regard to the following description of operation.

*Operation*

A dispensing means 260 is provided above the loading turret. Any one of a wide variety of dispensing means may be utilized with the machine 10. As illustrated, the dispensing means includes a guide chute having a plurality of cardboard tubes 262 disposed one behind the other. A feeding member 264 is provided to feed the tubes 262, one at a time, into the various notches 134, 134a, 134b, etc., on the loading turret 12.

In the various figures of the drawing, the loading turret 12 and mandrel turret 14 are continuously rotated in a counterclockwise direction. At minimum speed, such rotation will be ten revolutions per minute.

The tube 262 which has been dispensed into the notch 134 is supported at its ends by the surfaces 152 and 154 on the carriage 140 and is in line contact with the guide plates 136 and 138. At this point, the sprockets 174 and 180 are rotated in a direction to cause the pin 170 to reciprocate to the left in FIGURE 1B thereby transferring the tube 262 onto the mandrel 36. The mandrel 36 has been previously orientated so as to be in line with the notch 134 and is rotating with the tube 262 in the same direction at the same rate of speed.

The carriage 140 remains in its lefthand position as the mandrel 36 and tube 262 continue to rotate in a counterclockwise direction. As the mandrel 36 approaches the 11 o'clock position, the presence of a tube 262 on the mandrel is detected by microswitch 372. Hence solenoid 370 is not activated so that pin 362 remains in the position illustrated in FIGURE 17. As the mandrel 36 approaches a position approximating 10 o'clock, the pulley 48 engages the belt 74 and is rotated thereby. Such rotation of the mandrel 36 also results in a rotation of the tube 262 supported thereby so that an adhesive is applied to the entire length of the outer surface of the tube by brush 376.

As the tube 262 reaches the 9 o'clock position, it contacts the leading edge of a label cut from label stock 304. Since the tube is rotating about its longitudinal axis at this position, the adhesive on the tube causes the label to become convolutely wound therearound. The adhesive applied to the trailing edge of the label by brush 344 facilitates the overlap longitudinally extending seam for the label. Brush 350 supports the label during transfer so that the leading edge will contact the tube and applies a slight pressure on the label as the tube passes the same to assure that the label is applied free of wrinkles.

While the cut label is being wrapped on the tube as described above, the chamber 352 is in communication with atmosphere and roller 326 is in its elevated position. As soon as roller 326 reaches its elevated position, it immediately descends to provide the necessary pressure against roller 328 so additional label stock is fed to the right in FIGURE 10. While label stock is being fed to the right in FIGURE 10, chamber 352 is in communication with a vacuum pump. As the mandrel 36 continues to rotate in a counterclockwise direction, it reaches a position between 8 and 9 o'clock at which position the tube 262 is engaged by each of the knives 106. The knives 106 cut the tube 262 into a plurality of lengths.

Due to the interference positions between the knives 160 and the tube 262, the knife units 96 tend to rotate in a clockwise direction in FIGURE 4. Such rotation is opposed by the bias imposed thereon by the pressure in cylinder 120. As the tube 262 which has been cut into a plurality of lengths continues to rotate in a counterclockwise direction and the rear block 150 approaches the 6 o'clock position, its channel 168 will be disposed on opposite sides of the pin 170'. At this point, pin 170' will be reciprocated to the right in FIGURE 1B thereby stripping the cut lengths of tubing from the mandrel on which they were supported. Such cut lengths of tubing will fall onto the curved plate 244 and be pushed therealong to the 4 o'clock position in FIGURE 3. At such point, the cut lengths of tubing will fall or roll onto the belt 250 to be conveyed to a remote point.

While the carriage 140 was being reciprocated to the left in FIGURE 1B as described above, the carriage 142 was being reciprocated to the right in FIGURE 1B at the same time. Since the carriage for each of the notches 134, 134a, 134b, etc. is identical, it will be seen that the carriage in the region of the 12 o'clock or one o'clock position will be reciprocated to feed a tube onto a mandrel while the carriage in the 6 o'clock position is being reciprocated to strip cut lengths of a tube from a mandrel. All of the above operations are accomplished while the mandrels, mandrel turret, and loading turret are continuously rotating in the same direction at the same rate of speed.

The reciprocation of the pins 170 and 170' is effected by the means illustrated in FIGURES 2 and 6 which in turn is structurally interrelated with the sprockets 170 and 180. Such means is responsive to the rotation of the main drive shaft 90 which is coupled to the shaft 232. Rotation of shaft 232 causes rotation of sprocket 226. Rotation of sprocket 226 causes movement of the pin 232 on chain 230 around the sprockets 222, 224, 226 and 228. As the pin 232 reciprocates vertically in FIGURE 2, the side struts 208 and 210 are stationary. As the pin 232 passes around the upper righthand quadrant of sprocket 226, there is harmonic acceleration of the pin 232 with subsequent reciprocation to the left of the carriage which includes the side struts 208 and 210. As pin 232 reaches the 12 o'clock position of sprocket 226, and continues to move to the left in FIGURE 2, the carriage reciprocates to the left with constant velocity.

As pin 232 reaches point 236 on sprocket 222, the constant velocity movement to the left stops and there is harmonic deceleration to the point 238. From point 238 to point 240, the pin 232 moves between the struts 208 and 210. Hence, there is a dwell period between the reciprocation of the carriage from right to left and vice versa. Between point 240 and point 242 on sprocket 224, the pin 232 is subjected to harmonic acceleration again. As pin 232 moves to the right in FIGURE 2 from point 242, there is constant velocity of the carriage again.

Hence, it will be seen that the carriage is subjected to harmonic acceleration, constant velocity to the left in FIGURE 2, harmonic deceleration, dwell, harmonic acceleration, constant velocity to the right in FIGURE 2, harmonic deceleration, dwell, etc. Since the carriage is interconnected with chain 204 by link member 206, output shaft 198 is subjected to the same cycle described above. However, shaft 198 rotates while the carriage is being reciprocated. The cyclic operation of the shaft 198 is transmitted to the sprockets 174 and 180 by way of sprocket 196, chain 194, sprocket 192, shaft 190, gears 188 and 189, and shaft 186.

Since the rotation of shaft 232 is responsive to the main drive shaft 90, a proper choice of sprockets and other relationships for a predetermined mechanical advantage will automatically result in the pins 170 and 170' being reciprocated at the exact time that they are within a channel on the rear block of the carriages. The length of the stroke of the carriage and guide struts 208 and 210 is a direct function of the stroke of the carriages 140. In an operative embodiment, the struts 208 and 210 have a stroke which is ⅓ the length of the stroke of the carriages 140.

While the tubes are being stripped from a mandrel in the 6 o'clock position, and while such mandrels are rotating to the 12 o'clock position, the back up rollers are spaced from the mandrels as a function of the relationship between the cams 52 and 264 and their cam followers as illustrated more clearly in FIGURE 4. As pointed out above, the cams are stationary. As the turrets 12 and 14 rotate in a counterclockwise direction, the cam followers are cammed radially outwardly thereby rotating the cam follower arms. Before the cam follower arms are rotated, a new uncut tube 262 will have been telescoped over the mandrel at about the 12 o'clock position. As the last mentioned mandrel has reached the 9 o'clock position, the cam follower arm will have been rotated about shaft 66. Such rotation causes the bracket arms 56 and 60 to move towards each other thereby resulting in contact between the back up rollers and the label which has just been applied to the tube 262.

The back up rollers support the tube and rollingly contact the same between the 9 o'clock position and the 7 o'clock position. In this regard, it will be remembered that the mandrels are supported in cantilever fashion from the plates 28 and 30 of the turret mandrel 14. As the mandrels approach the 7 o'clock position, the spring bias on each of the follower arms causes the cam follower to move radially inwardly with respect to the central shaft 16 which in turn results in the bracket arms moving away from the surface of the cut lengths of the tube.

Hence, it will be seen that the mandrels receive a tube at about the 12 o'clock–one o'clock position, adhesive is applied to the tube at about the 10 o'clock position, the tube is supported by back up rollers between the 9 and 7 o'clock positions, a label is convolutely wound on the tube in the 9 o'clock position, the tube is cut into predetermined lengths between the 9 and 8 o'clock positions, while the tubes are rotating about their longitudinal axis between the 10 and 8 o'clock positions, and the cut lengths of the tube are stripped in the 6 o'clock position. Between about the 6 o'clock and one o'clock positions in a counterclockwise direction, the mandrels do not have a tube telescoped thereover.

If a tube is not present on a mandrel, the label device 300 must be completely inactive. When microswitch 327 detects the absence of a tube, solenoid 370 is activated to reciprocate pin 362 to the left in FIGURE 17 as pin 362 passes the solenoid 370. The thusly projected pin 362 is positioned ahead of its mandrel and trips a series of interlock switches which reciprocates glue pot 374 to the left in FIGURE 10, deactivates photoelectric cell 346 so that roller 326 is raised upwardly, deactivates solenoid 340 so that no label is cut by blade 338, and chamber 352 remains evacuated. Each of these elements remain deactivated only momentarily but for sufficient time to permit this mandrel to pass by. When pin 362 passes the 7 o'clock position, it is cammed to the position illustrated in FIGURE 17 by cam 388, see FIGURE 11.

The carriage 336 is movably supported so that different lengths of label stock 304 may be cut as different diameter tubes are being recut on the apparatus 10. Once the position of the carriage is adjusted, it remains stationary during any particular run of tubes. It should be noted that the distance from marking 386 and the point where a label is cut from label stock 304 remains constant. When a label is convolutely applied to an article, less label stock is used as compared to a spirally wound label. It has been found that label stock adapted to be spirally wound presents numerous alignment problems so that the printing will be properly disposed on the tube. As a result of the present invention, no wastage is encountered between discrete cut sections of the tube whereas devices proposed heretofore require about two percent (2%) wastage.

Hence, it will be seen that a novel cutting machine has been provided wherein a loading turret and mandrel turret are continuously rotatably driven in the same direction at the same rate of speed. A feeding means is provided to feed tubes onto continuously rotating mandrels and remove the same after the tubes have been cut into a plurality of lengths by cutting means adjacent the periphery of the rotating mandrels.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising a mandrel turret, mandrels supported in cantilever fashion from said turret, means supporting said mandrel turret for rotation, the longitudinal axes of said mandrels being substantially parallel to the axis of rotation of said turret, means adjacent the peripheral path of said mandrels for applying a label to a tube supported by one of said mandrels during rotation thereof, a cutting means supported adjacent the peripheral path of said mandrels as said mandrels are rotated by said turret for cutting a labeled tube into a plurality of smaller lengths.

2. Apparatus in accordance with claim 1 wherein said last mentioned means includes a loading turret, said turret being mounted for rotation about a common axis, and means interconnecting said turrets for simultaneous rotation in the same direction at the same rate of speed.

3. Apparatus in accordance with claim 1 wherein said label applying means includes means for applying adhesive to the outer peripheral surface of a tube while it is telescoped over one of said mandrels and means for feeding a label so that it may be convolutely wound on the last mentioned tube.

4. Apparatus in accordance with claim 3 wherein said label feeding means includes feeding rollers between which label stock is fed, and means for cutting label stock into discrete labels in response to detection of a marking on the label stock.

5. Apparatus comprising a mandrel turret, mandrels supported in cantilever fashion from said turret, means supporting said mandrel turret for rotation, the longitudinal axes of said mandrels being substantially parallel to the axis of rotation of said turret, means for rotating the mandrels about their longitudinal axes, means for applying a label to a tube telescoped over one of said mandrels while the mandrel is rotating.

6. Apparatus in accordance with claim 5 wherein said label applying means includes an endless roll of label stock, and means for periodically cutting the label stock into discrete labels.

7. Apparatus in accordance with claim 5 wherein said label applying means includes a carriage mounted for movement toward and away from the peripheral path of the mandrels as said mandrels are rotated by said turret, and means supported by said carriage for cutting label stock into discrete labels.

8. Label applying device for convolutely applying a label to an article comprising means for rotatably supporting a roll of label stock, means for feeding label stock from a roll to an accumulation device wherein a supply of label stock is accumulated and stored, a cutter for cutting label stock into discrete labels, means for feeding label stock from the accumulation device to the cutter, means for actuating the cutter in response to detection of a mark on label stock, and a vacuum transfer mechanism for supporting a cut label while it is applied to an article with said vacuum transfer mechanism having a generally horizontal surface for supporting cut labels prior to application of the same to an article.

9. A device in accordance with claim 8 wherein the cutter has a means thereon for applying a narrow band of adhesive along one edge of a cut label while a label is being cut by the cutter.

10. A device in accordance with claim 8 including a means between the cutter and the accumulation device for preventing label stock from moving toward the accumulation device from the cutter.

11. A device in accordance with claim 8 including a movable carriage, means for selectively moving the carriage, and said cutter, second mentioned feeding means and the actuating means for said cutter being supported by said carriage.

12. Apparatus in accordance with claim 8 including means for controlling the operation of the first mentioned feeding means in response to the amount of label stock stored in the accumulation device.

13. A device in accordance with claim 8 wherein said second mentioned feeding means includes a drive roller, an idler roller above said drive roller, said idler roller being structurally interrelated with said actuating means for the cutter so that the idler roller is moved out of contact with label stock simultaneously with the movement of the cutter to a position wherein it may cut a discrete label from the label stock.

References Cited by the Examiner

UNITED STATES PATENTS

| | | | |
|---|---|---|---|
| 1,443,610 | 1/1923 | McGhee et al. | 156—456 |
| 1,936,357 | 11/1933 | Geczy | 156—378 |
| 2,298,366 | 10/1942 | Gladfelter et al. | 82—85 XR |
| 2,344,185 | 3/1944 | Tuthill | 156—355 XR |
| 2,507,683 | 5/1950 | Smith | 156—378 XR |
| 2,657,816 | 11/1953 | Everett | 156—567 XR |
| 2,670,576 | 3/1954 | Hockett | 82—85 XR |

FOREIGN PATENTS 449,175   6/1948   Canada.

EARL M. BERGERT, *Primary Examiner.*